United States Patent [19]
Lawton et al.

[11] Patent Number: 5,014,134
[45] Date of Patent: May 7, 1991

[54] IMAGE COMPRESSION METHOD AND APPARATUS

[75] Inventors: Wayne M. Lawton, Somerville, Mass.; John C. Huffman, Windham, N.H.; William R. Zettler, Jr., Brookline, Mass.

[73] Assignee: Aware, Inc., Cambridge, Mass.

[21] Appl. No.: 405,469

[22] Filed: Sep. 11, 1989

[51] Int. Cl.$^5$ .............................................. H04N 1/419
[52] U.S. Cl. ............................... 358/261.3; 358/262.1; 358/432; 358/426
[58] Field of Search ............... 358/261.1, 261.2, 261.3, 358/426, 427, 262.1, 428, 430, 431, 432, 433, 261.4; 341/178

[56] References Cited

U.S. PATENT DOCUMENTS

| 4,151,562 | 4/1979 | Tregay | 358/261.3 |
| 4,754,336 | 6/1988 | Nishizawa | 358/261.1 |
| 4,811,112 | 3/1989 | Rutledge | 358/261.2 |
| 4,817,182 | 5/1987 | Adelson | 382/56 |

Primary Examiner—Joseph A. Orsino
Assistant Examiner—Jerome Grant, II
Attorney, Agent, or Firm—McCubbrey, Bartels, Meyer & Ward

[57] ABSTRACT

A system for compressing images is disclosed. The system utilizes a transformation which is equivalent to expanding the image using a system of wavelets having finite support.

11 Claims, 4 Drawing Sheets

IMAGE COMPRESSION METHOD AND APPARATUS

BACKGROUND OF THE INVENTION

The present invention relates to data processing and more specifically to methods and apparatuses for performing image compression.

Without image compression, the transmission of images recquires an unacceptable bandwidth in many applications. As a result, methods of compressing images have been the subject of numerous research publications. Image compression schemes convert an image consisting of a two-dimensional array of pixels into a sequence of bits which are to be transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce the transmission time. It will also be apparent to those skilled in the art that image compression systems may also be advantageously employed in image storage systems to reduce the amount of memory needed to store one or more images.

Image compression involves transforming the image to a form which can be represented in fewer bits without losing the essential features of the original image. The transformed image is then transmitted over the communication link in question and the inverse transformation applied at the receiver to recover the image or a reasonable facsimile thereof.

The degree to which the recovered image differs from the original image is referred to as the distortion of the image. Distortion is normally measured as the root mean square of the pixel by pixel differences of the original and recovered images. As will be discussed in more detail below, images with the same level of distortion may differ greatly in their subjective distortion, i.e., distortion as perceived by an observer. Hence, choosing compression algorithms based on such measures of distortion may lead to methods that achieve less than the optimum result as viewed from the human perspective.

The compression of an image typically requires two steps. In the first step, the image is transformed to a new representation in which the correlation between adjacent pixels is reduced. This transformation is usually completely reversible, that is, no information is lost at this stage. The number of bits of data needed to represent the transformed image are at least as large as that needed to represent the original image. The purpose of this transformation is to provide an image representation which is more ideally suited to known compression methods.

In the second step, referred to as quantization, each pixel in the transformed image is replaced by a value which is represented in fewer bits, on average, than the original pixel value. In general, the original gray scale is replaced by a new scale which has coarser steps and hence can be represented in fewer bits. The new gray scale typically has levels in which the different steps are of different size. The new gray scale is calculated from the statistical distribution of the pixel values in the transformed image.

The quantization process typically results in loss of information, since there will always be at least two different pixel levels in the original gray scale that will be assigned to the same level in the new gray scale. For example, a single level in the new gray scale might correspond to levels 200 through 210 in the above mentioned 256-level gray scale. Hence, the ability to make distinctions based on differences in pixel intensity in this range will be lost, since, after quantization, all pixels in this range will have been assigned the same level in the new gray scale. This loss of information will be referred to as quantization errors.

The quantized image resulting from the above two steps is often further coded for transmission over the communication link in question. This coding is completely reversible. Its purpose is to provide a more compact representation of the quantized picture At the other end of the communication link, the coded image is decoded, the quantization transformation is reversed and the inverse of the first transformation performed on the resulting image to provide a reconstructed image.

The extent to which the reconstructed image differs from the original image will, in general, depend on the above mentioned first transformation and on the manner in which it interacts with the quantization system. In the following discussion, the first transformation in question will be referred to as the image transformation. In general, the image transformation is equivalent to calculating the coefficients of a series expansion of the image in some set of expansion functions in a manner analogous to calculating the Fourier transform of a one-dimensional function. These coefficients are then quantized and transmitted. At the receiving end, the image is reconstructed by effectively multiplying the particular functions in question by the transmitted coefficients and then summing the results.

The extent to which a quantization error causes an error in the reconstructed image will depend on the expansion functions in question. It is useful to define two classes of functions, those with compact support and those with non-compact support. For the purposes of this discussion, a function has compact support if it is zero outside some limited region of the image.

If the expansion functions have non-compact support, then a quantization error can effect a very large portion of the reconstructed image. Each pixel of the reconstructed image may be viewed as being calculated by summing contributions from a number of expansion functions multiplied by the transmitted coefficients. The number of such functions that contribute to the intensity of a given pixel in the reconstructed image depends on the compactness of the function set chosen. The less compact the expansion set, the larger the number of functions that can contribute to each point on the reconstructed image Thus, the probability that a quantization error will be present is greater. In addition, an error in a coefficient which multiplies a function in a non-compact expansion set will affect many more pixels since the function in question has a larger spatial extent.

Prior art image transformations utilize non-compact expansion function sets. Hence, quantization errors tend to affect the entire image In addition, the errors in question tend to be very obvious to human observers of the reconstructed images. These errors produce artifacts such as stripes in the image. To lessen the visual impact of such artifacts, prior art systems often incorporate low-pass filters. However, these filters often remove important picture detail. Thus, this method of eliminating the artifacts is less than ideal. In addition, the low-pass filtering requires additional computational capacity in the image compression apparatus. This additional capacity increases the cost of the apparatus in question.

The image transformation circuitry is a significant cost factor in image compression apparatuses. The required computational expense clearly depends on the image transformation selected. Hence, an image compression apparatus which utilizes an image transformation which requires less computation than prior art image transformation would be very advantageous.

Accordingly, it is an object of the present invention to provide an improved image compression method and apparatus.

It is a further object of the present invention to provide an image compression apparatus and method which utilizes an image transformation based on a set of expansion functions which have compact support.

It is yet another object of the present invention to provide an image compression apparatus and method which requires less computational capacity than prior art image compression systems.

These and other objects of the present invention will become apparent to those skilled in the art from the following detailed description of the present invention and the accompanying drawings.

SUMMARY OF THE INVENTION

The present invention comprises an apparatus and method for compressing an image. The image comprises a two dimensional array of pixels organized as a plurality of rows and columns. The apparatus of the present invention comprises image transforming circuitry for transforming the image to form a plurality of component images. The component images represent different spatial frequency components of the image and comprises two dimensional arrays of pixels. The present invention also includes quantization circuitry for assigning integer values to the pixels of the component images. The transformation used to generate the component images comprises circuitry for generating two vectors, $y_L$ and $y_H$, from a linear array, $x(i)$ where i runs from 1 to M.

$$y_L(m) = \sum_{k=0}^{N-1} a(k)x(2m - N + k)$$

$$y_H(m) = \sum_{k=0}^{N-1} a(k)(-1)^{k+1}x(2m + 1 - k)$$

Here, the number of components in $y_L$ and $y_H$ will depend on the values assigned to $x(i)$ for $i<0$ and $i>M$. In the preferred embodiment of the present invention $x(i) = x(i+M)$. In this case, $y_L$ and $y_H$ will have M/2 components and m runs from 0 to M/2−1. The $a(k)$ satisfy the conditions $$\sum_{i=0}^{N-1} a^2(i) = 1$$

and $$\sum_{i=0}^{N-1} a(i)a(i+k) = 0 \text{ for any integer } k \text{ which is non-zero and even}$$

wherein $a(k) = 0$ for $k<0$ or $k>(N-1)$ and N is an even number greater than 2 and less than 30, and $$\sum_{i=0}^{N-1} a(i) = \sqrt{2}.$$

The present invention also includes circuitry for recovering an image from its component images. This circuitry synthesizes a third image from first and second component images. The synthesizing circuitry includes circuitry for generating a vector z having components, $z(i)$, from two arrays of pixels $x_L(i)$ and $x_H(i)$, $x_L$ being taken from first component image and $x_H$ being taken from said second component image. Here, $$z(2m) = \sum_{k=0}^{(N/2)-1} a(2k)x_L[m - k + (N/2)] + \sum_{k=0}^{(N/2)-1} a(2k+1)x_H(m+k)$$

$$z(2m+1) = \sum_{k=0}^{(N/2)-1} a(2k+1)x_L[m + (N/2) - k] - \sum_{k=0}^{(N/2)-1} a(2k)x_H(m+k).$$

DETAILED DESCRIPTION OF THE INVENTION

For the purposes of this discussion, an image will be denoted by a two-dimensional MxM array of pixels $I_{i,j}$. Although the present discussion will be limited to square arrays, the extension of the method to M×M' arrays, where M' is different from M, will be apparent to those skilled in the art. For the purposes of this discussion, it will be assumed that $I_{i,j}$ is zero if either i or j is less than 0 or greater than M−1.

Figure 1:
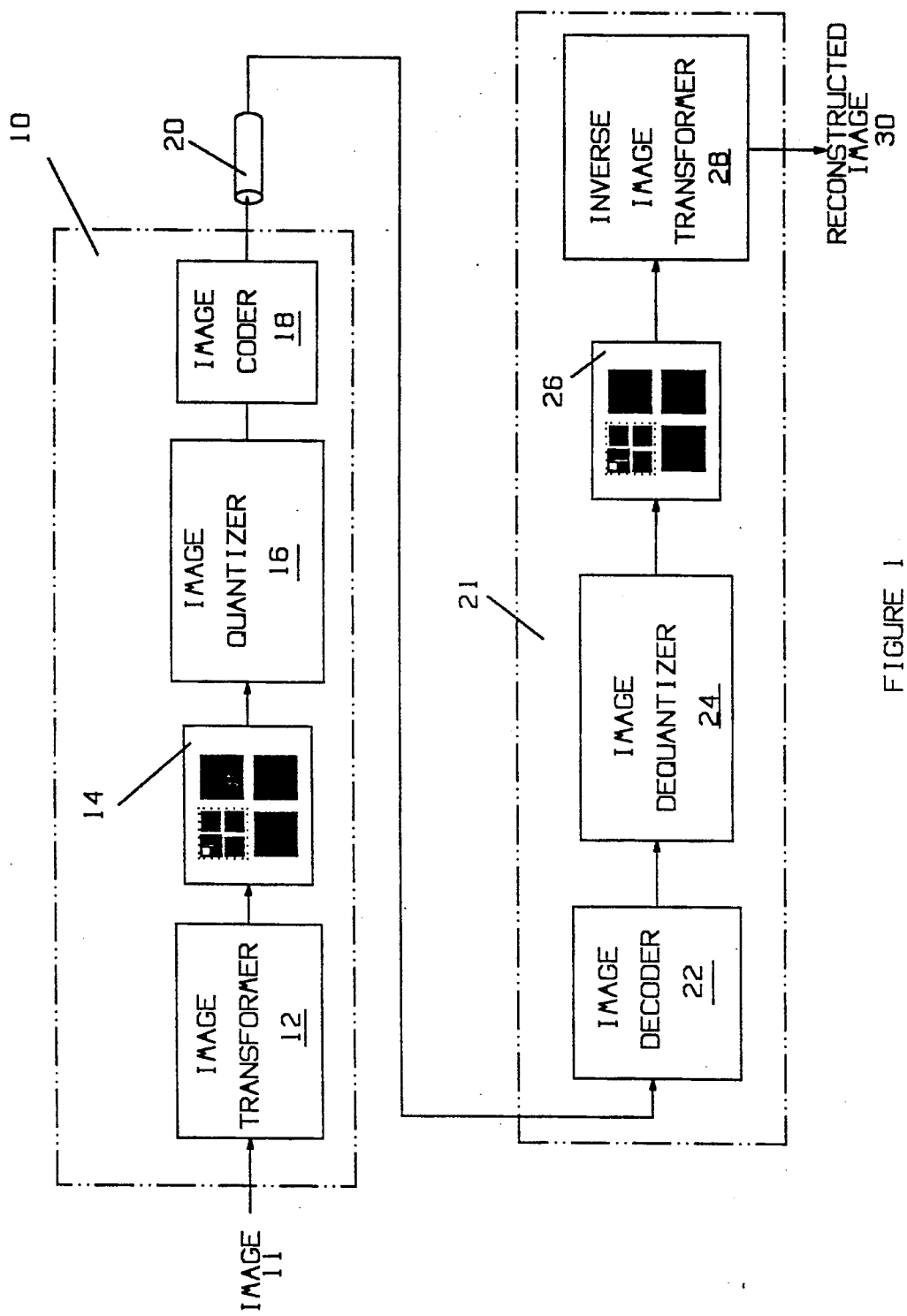
FIG. 1 is a block diagram of an image compression and decompression apparatus according to the present invention.

FIG. 1 illustrates an image compression system 10 according to the present invention and the related image decompression system 21. An image 11 is input to an image transformer 12 which transforms image 11 into a hierarchial image representation 14. Image representation 14 is then quantized by image quantizer 16. The quantized image version of image representation 14 is then encoded by image coder 18 prior to being transmitted on communication link 20.

The compressed image is received by image decompression system 21 where the above described process is reversed. The encoded transformed image is first decoded by image decoder 22 which recovers the quantized version of image representation 14. The levels in the quantized version of image representation 14 are then replaced by the corresponding levels to form an approximation of image representation 14 which is shown at 26. The inverse of the image transformation performed by image transformer 12 is then applied to approximation 26 by inverse image transformer 28 which outputs the reconstructed image 30.

The image quantization and dequantization steps described above are conventional in the art; however, some discussion thereof will be useful in understanding the advantages of the present invention. In the preferred embodiment of the present invention, so called scalar quantization is utilized. Assume that the pixels, $I_{i,j}$, in the original image had values distributed between 0 and 255, and that there were 1,000,000 such pixels. Since an intensity value in this range can be represented by 8-bits/pixel, a total of $8 \times 10^6$ bits are needed to represent the uncompressed image.

The simplest method of compressing the image would be to reduce the number of allowable values for $I_{i,j}$. For example, the number of bits could be reduced by a factor of two if only 4 bits were allocated for each pixel. However, in this case there would only be 16 possible gray levels instead of the original 256. The gray level of a pixel in the quantized image would be the same as the corresponding pixel in the original image divided by 16. However, since only the integer part of the division is kept, all original values between 0 and 15 would now be represented by 0, those between 16 and 31 would be represented by 1, and so on. The original image had a precision of 1 part in 256; hence, the compression has increased the error rate by a factor of 16 for a gain of only a factor of two in compression.

Now assume that the above exemplary image can be transformed into two component images of different numbers of pixels. It will be assumed further that the inverse image transformation exists, i.e., the two component images can be recombined to form the original image. The number of pixels in the first component image will be denote by S, and the number of pixels in second component image will be denoted by B. Assume further that $S << B$ and that the spread of intensity values in S is much greater than the spread in the intensity values of B.

For example, the pixel values in S might be distributed between 0 and 255, while those in B are distributed between 0 and 7. The first component image will require $S \times 8$ bits to represent. However, the second component image may be quantized allowing only 3 bits per pixel; hence, it requires only $B \times 3$ bits. Thus the two component images may be represented in $S \times 8 + B \times 3$ bits. As noted above, the transformation is assumed to have the property that $S << B$. Hence, the quantized component image representation requires only slightly more than 3 bits per pixel. That is, a compression ratio of between 2 and 3 has been obtained. Furthermore, no loss in precision has occurred in this example, since the second component image only had 8 different pixel values. That is, the reconstructed image obtained by applying the reverse transformation on the quantized image would be identical to the original image.

If one is willing to introduce some errors into the compressed image, the compression ratio obtained in the above example may be increased. Suppose it were known that the information content of the second component image is less than that of the first image component. Then the accuracy with which the second image component need be represented is substantially less. In this case, the second component image could be quantized with fewer bits. For example, one might use only 2 bits per pixel. In this case, the reconstructed image would differ from the original image.

The degree to which the reconstructed image is distorted can be measured in both quantitative and subjective terms. In quantitative terms, the root mean square error between the pixels of the original and reconstructed images is often used to measure distortion. However, it must be noted that two images reconstructed from the same image and having the same root mean square error may appear significantly different depending on the manner in which the errors are introduced. If, for example, the errors are all localized in one band of the reconstructed image, the reconstructed image will appear to have a stripe. Such a striped image is subjectively more objectionable than an image which has random noise with an equivalent aggregate error added thereto.

The manner in which the quantization errors are reflected in the reconstructed image will, in general, depend on the particular transformation used to convert the original into the component images. For example, when Fourier transforms or their equivalent are utilized, the above mentioned striping of the image often occurs. The effect of these artifacts can be reduced by post-processing the image through a low-pass filter. However, this solution increases the computational effort and lowers the resolution of the final reconstructed image.

The above discussion of quantization utilized a particularly simple form of assigning the quantized levels to the individual levels in the images. More optimum methods are known to the art. In general, these methods model the statistical distribution of the pixels in the image to be quantized. Given the distribution and its variance and the number of bits to be allocated to each pixel, one can calculate the optimum placement of the levels. Since such optimization calculations are well known in the art, they will not be discussed in detail here. For more details of the procedures in question, the reader is referred to William K. Pratt, Digital Image Processing, pp141–46, John Wiley & Sons, Inc., New York, 1978, which is hereby incorporated by reference.

The coding and decoding steps described above are likewise known to the prior art and, hence, will not be described in detail here. These steps provide further compression of the quantized image by exploiting various redundancies or repeated sequences in the data. A typical encoding and decoding system is described in the IBM Journal of Research and Development 32 No. 6 in a series of articles on the Q-coder. These articles are hereby incorporated by reference. It should be noted that although such coding is preferred, image compression/decompression without it is also possible.

In the above discussion, it was assumed that there existed a transformation that divided the image into component images of different sizes in which more of the information content of the image was concentrated in one of the component images than in the other component images. It was also noted that it would be advantageous if the quantization error in one of the pixels of the transformed image at most affected a few pixels in reconstructed image. This latter condition guarantees that the errors are in the form of noise rather than stripes or other large are artifacts. The present invention provides such a transformation.

The image transformation utilized in the present invention is an iterative process in which the original image is transformed into a series of component images. The information content of the various component images differ in a manner which allows the quantization step described above to provide a greater degree of compression for a given subjective image quality than would be obtained if one of the image compression transformations utilized in prior art image compression systems had been utilized.

The iteration process starts with the image to be compressed. In the preferred embodiment of the present invention, each step in the iteration transforms an $M \times M$ image into four $(M/2) \times (M/2)$ component images. Three of these component images contain information pertaining to the high spatial frequency components of the $M \times M$ image, the fourth is related to the low spatial frequency components.

The elements of the component images obtained in the first iteration are coefficients of an expansion of the original image in a set of wavelet functions having compact support. The elements of the component images from the remaining iterations are coefficients of an expansion of one of the component images obtained in the prior iteration. For simplicity, the elements of the various component images will be referred to as pixels in the following discussion even though they are not actually pixels in an optical image.

Figure 2:
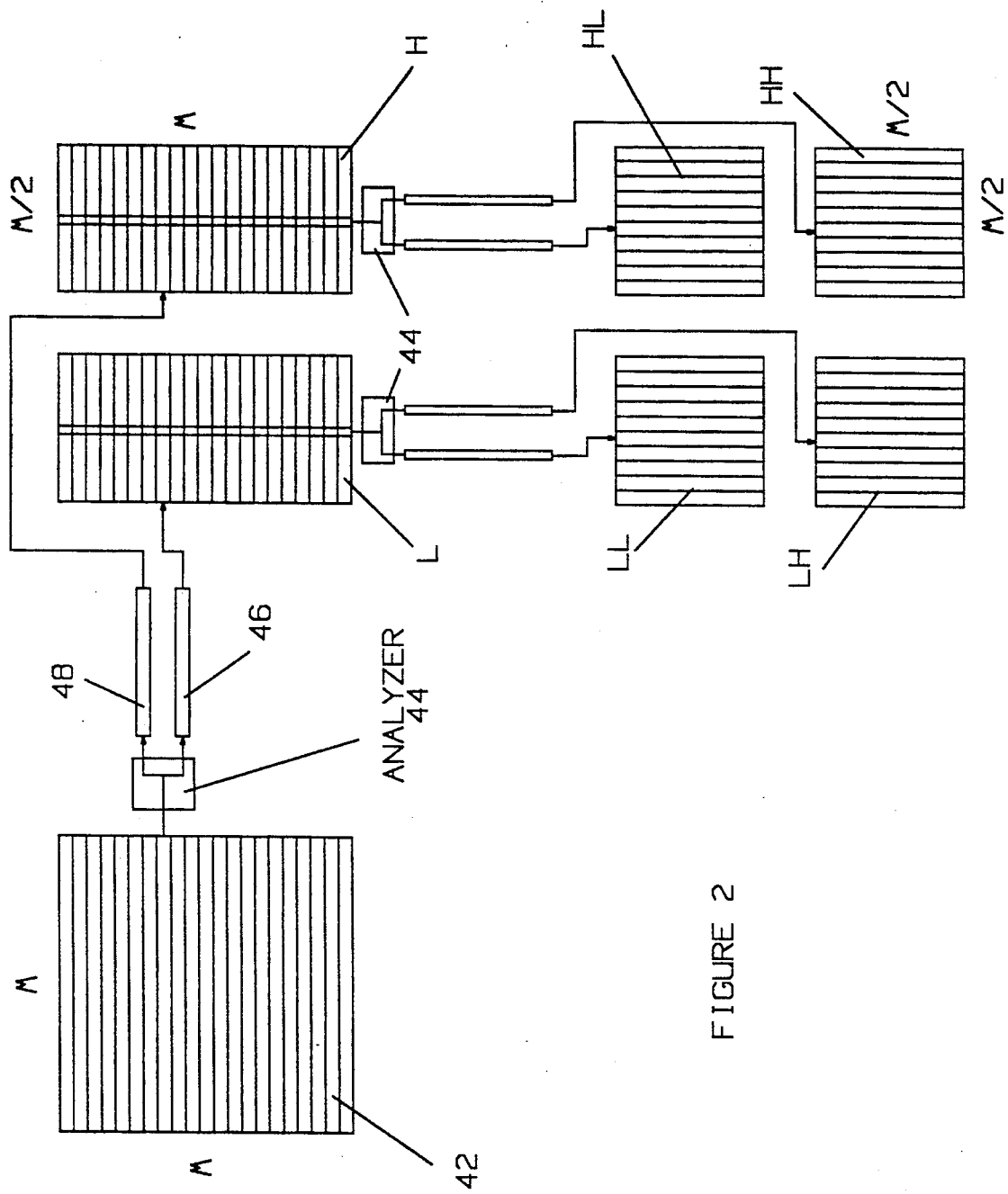
FIG. 2 is a block diagram of an analyzer apparatus for decomposing an image into four component images.

The transformation is carried out in two steps as indicated in FIG. 2. In the first step, an image 42 consisting of M columns and M rows is transformed into two images denoted by L and H by a transformation circuit 44 which will be referred to as Analyzer 44. The L and H images each have $(M/2)$ columns and M rows.

Analyzer 44 operates on each row of image 42 as follows. Each row of image 42 may be viewed as consisting of a vector having M components, $x(i)$. If M is not even, a zero is appended to x to force M to be even. Analyzer 44 multiplies the elements of x with the elements of a vector having components $a(k)$, where k runs from 0 to $N-1$, to form two vectors having components, $y_L L(i)$ and $y_H(i)$. The vectors $y_L$ and $y_H$ are shown schematically at 46 and 48, respectively. These vectors each have M/2 such elements. The components of $y_L(i)$ and $y_H(i)$ are calculated as follows:

$$y_L(m) = \sum_{k=0}^{N-1} a(k)x(2m - N + k) \quad (1)$$

$$y_H(m) = \sum_{k=0}^{N-1} a(k)(-1)^{k+1}x(2m + 1 - k)$$

Here, m runs from 0 to $(M/2)-1$. The vector $y_L$ obtained by so transforming the ith row of image 42 becomes the ith row of image L as shown in FIG. 1. Similarly, the vector $y_H$ obtained from the ith row becomes the ith row of image H.

The above described transformation requires that some value be assigned to pixels that lie outside the original image, i.e., $x(i)$ for $i<0$ or $i>M-1$. In the preferred embodiment of the present invention, x is assumed to be cyclic, i.e., $x(i)=x(i+M)$. In this case, it can be shown that $y_L$ and $y_H$ are each periodic and have period M/2.

In prior art image compression systems, the image is often assumed to be embedded in a "sea of zeros". This is equivalent to defining x to be zero for $i<0$ or $i>M-1$. In this case, it can be shown that $y_L$ and $y_H$ each have $(M/2)+(N/2)$ elements. All of these elements must be retained if the image is to be accurately reconstructed. Hence, the memory required to store the component images is greater than that required to store the original image. Further, the exact size depends on the number of iterations performed. This complicates the design of the system components.

In the second step in the transformation, each of the L and H images is further transformed into two $(M/2) \times (M/2)$ component images. Image L is used to create two images, LL and LH in a manner analogous to that described above, except that the image is divided into columns instead of rows. Each column is divided into its M element column vectors. Each vector is transformed using Analyzer 44 into a two M/2 element column vectors having elements $y_L$ and $y_H$ using the transformation defined in Eq. (1). The vector $y_L$ obtained by transforming the ith column of image L becomes the ith column of image LL. Similarly, the vector $y_H$ becomes the ith column of image LH. The remaining images HL and HH are obtained in an analogous manner.

Provided tne elements $a(k)$ satisfy certain conditions which will be described in more detail below, the LL image can be shown to represent the low spatial frequency component of the data in image 42. Likewise, the remaining images can be shown to represent the high frequency components of the image.

Figure 3:
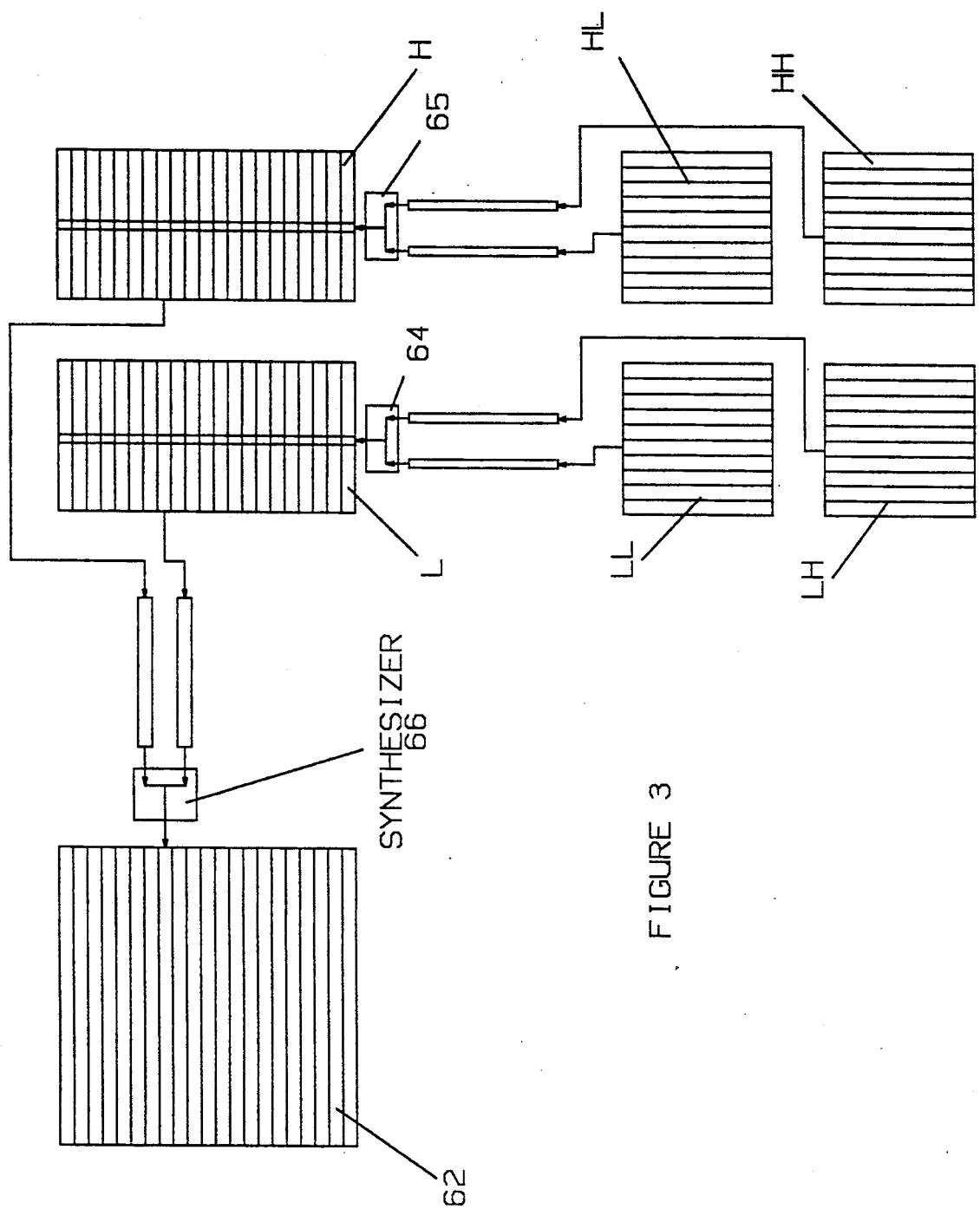
FIG. 3 is a block diagram of a synthesizer apparatus for synthesizing an image from four component images of the type produced by the analyzer apparatus shown in FIG. 2.

The decomposition described above can be reversed to regenerate the original image 42 provided the $a(k)$ satisfy the constraints described below. FIG. 3 is a block diagram of an apparatus for carrying out the reverse transformation. The apparatus combines the HH and HL components to generate an H image, and the LH and LL components to form an L image. Synthesizer 64 combines one column from HH and the corresponding column from HL to form a corresponding column of the H image. Similarly synthesizer 65 combines two columns of the LL and LH to form a column of the L image. The L and H images are similarly combined by synthesizer 66 to form a reconstructed image 62.

Synthesizers 64–66 operate on two vectors having components $x_L(i)$ and $x_H(i)$ to produce an output vector having components $z(i)$. Synthesizers 64–66 are identical circuits, they are given different reference numbers to facilitate the following discussion. The number of components in the output vector is twice that in each of the input vectors. The output vector is calculated as follows:

$$z(2m) = \sum_{k=0}^{(N/2)-1} a(2k)x_L[m - k + (N/2)] + \quad (2)$$

$$\sum_{k=0}^{(N/2)-1} a(2k + 1)x_H(m + k)$$

$$z(2m + 1) = \sum_{k=0}^{(N/2)-1} a(2k + 1)x_L[m + (N/2) - k] -$$

$$\sum_{k=0}^{(N/2)-1} a(2k)x_H(m + k).$$

As noted above, the a(k) must satisfy certain conditions. These conditions will now be discussed. The first set of conditions are needed to guarantee that the image transformation by which a single vector x is split into components, $x_L$ and $x_H$ is invertable. That is, if a vector x is inputted to an analyzer which outputs vectors, $x_L$ and $x_H$, then the output of a synthesizer which has as its inputs $x_L$ and $x_H$ will be x. These conditions can be written as follows:

$$\sum_{i=0}^{N-1} a^2(i) = 1 \quad (3)$$

and $$\sum_{i=0}^{N-1} a(i)a(i + k) = 0 \quad (4)$$

Here, a(k)=0 for k<0 or k>(N−1), and k is any non-zero even integer. N must be an even number.

Although the conditions specified in Eqs (3) and (4) guarantee invertibility, they do not guarantee that $x_L$ and $x_H$ will be the low and high frequency components of x. For this to be true, the a(k) must also satisfy the condition:

$$\sum_{i=0}^{N-1} a(i) = \sqrt{2} \quad (5)$$

There a large number of sets of a(i) that satisfy the above conditions. In the preferred embodiment of the present invention, the parameters a(k) further satisfy the condition:

.1h8

$$\sum_{i=0}^{N-1} a(N - 1 - i)(-1)^i i^Q = 0 \quad (6)$$

where Q is any non-negative integer which less than or equal to (N/2)−1. The improvement obtained with this definition is related to the fact that the expansion coefficients are zero if x is a polynomial of degree less than N/2.

In general it is desirable to use an N>4. If N=2, the polynomial in question is a constant. If N=4, the polynomial is a line. Since a constant or linear approximation are poor approximations for any curve having finite curvature, such an approximations are likely to be a poor fit to the image data. In the preferred embodiment of the present invention, N=6, and the a(k) to an accuracy of four decimal places are as follows:

| k | a(k) |
|---|------|
| 0 | .3327 |
| 1 | .8069 |
| 2 | .4599 |
| 3 | −.1350 |
| 4 | −.0854 |
| 5 | .0352 |

As N is increased, the distortion introduced into the reconstructed image is reduced as measured by root mean square error. However, it is found experimentally that the subjective quality of the image begins to deteriorate if N is larger than 20 to 30. This latter observation results from the fact that the number of pixels in the reconstructed image that will be affected by a quantization error in one of the component errors is related to N. Hence, as N is increased, quantization errors can result in large artifacts such as blotches.

Figure 4:
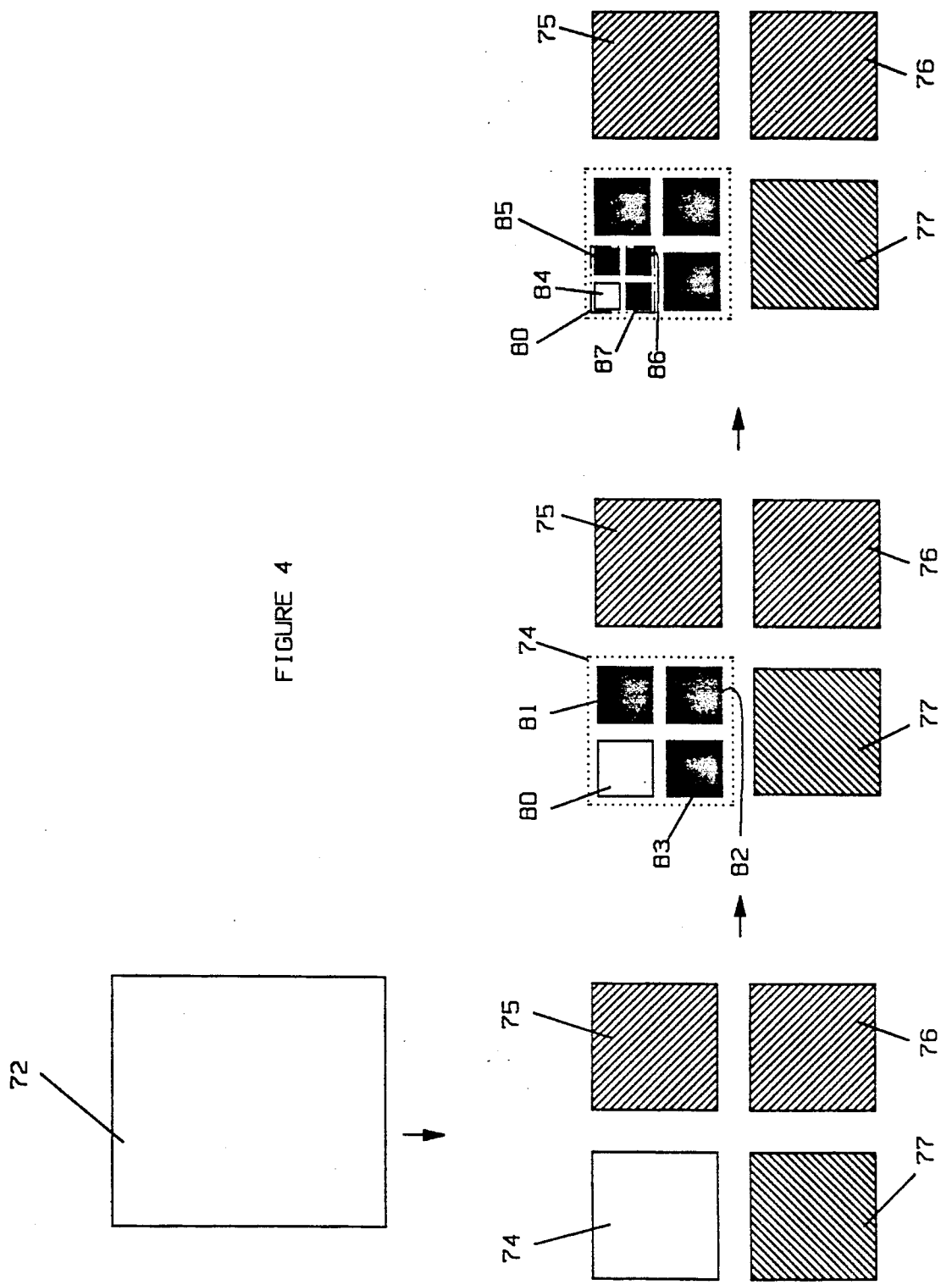
FIG. 4 illustrates the manner in which an image may be successively decomposed into a series of component images having different spatial frequencies.

Having described how an image may be transformed into four images having differing spatial frequency components and the process reversed, the image transformation utilized in the compression system of the present invention will be described in more detail. Referring to FIG. 4, it will be assumed that the original image 72 has P×P pixels. Image 72 is decomposed into four component images, 74–77, as described above, component image 74 being the LL image. Each of the component images 74–77 are (P/2)×(P/2) pixels.

Next, component image 74 is decomposed into its four component images 80–83, component image 80 being the LL component image. Component images 80–83 each have (P/4)×(P/4) pixels. It should be noted that the memory space needed to store the image at each stage of the decomposition is the same as that needed to store the original image.

The iteration continues by decomposing the LL component into its component images at each stage. Hence, at the next stage, component image 80 will be decomposed into component images 84–87. The iteration may be continued until the LL component image is a 1×1 image, i.e., a single pixel. However, in the preferred embodiment of the present invention, the process is terminated at the step just before the LL component image becomes less than N×N.

Once the image has been transformed into the above described component image representation, each of the component images is quantized. As noted above, it is at the quantization step that information is lost.

It is found experimentally that the information content of the lower frequency component images is higher, in general, than that of the higher frequency component images. That is, the observed variance of the statistical distribution of the pixels in the lower frequency component images is higher than the variance of the higher frequency component images. Hence, the transformation of the present invention can be used to provide good image compression by assigning more bits at the quantization stage to the lower frequency component images.

In the preferred embodiment of the present invention, the statistical distribution of the pixel intensities in each of the component images is fit to a Laplacian distribution. The number of pixels assigned to each of the component images is then made in relation to the variance of the observed distributions and the desired level of image compression. It is found experimentally that satisfactory images may be reconstructed even after compressions in excess of 100:1.

As noted above, some assumption must be made for the pixels values that lie outside the original image. The assumption that these values are 0 or that the image is periodic (i.e., x(i)=x(i+M)) results in te original image being viewed as consisting of a larger picture having an image with a discontinuity at the boundary of the original image. This type of discontinuity often results in artifacts in the images produced by reconstructing a transformed image that has also been compressed. By terminating the iteration when the LL image is N×N, these artifacts are reduced.

It should be noted that these edge artifacts are less critical in the present invention than in prior art image compression systems. The image transformation utilized in the present invention is based on a digital wavelet transformation in which the wavelets have compact support, i.e., the wavelets are only non-zero on a small interval. This is reflected in the choice of N. As noted above, N is preferably small, i.e., 6. So long as N is small compared to the number of pixels in the component image being decomposed, any such artifacts will be limited to a region near the boundary of the image. The size of this region will depend on the choice of N.

It should be noted that prior art image compression schemes based on functional decompositions which satisfy conditions (1) through (6) above are known in the image compression arts. However, the values of N utilized in these transformations are large. In these prior art schemes, N is typically larger than 32. These methods use large N values because they are attempting to duplicate the results that would be obtained by a Fourier transformation based sub-band decomposition of the image.

Because these methods use large values of N, they suffer from the various problems described above. They are computationally less efficient than the present invention. In addition, they suffer from non-local artifacts resulting from quantization errors.

It may be shown that the calculations detailed in Eq. (1) above are equivalent to expanding the function whose digital representation is x(i) in a set of wavelet functions having compact support. The value of N is a measure of the support of the wavelets in question. N is related to the maximum number of grid points on which the wavelet functions have non-zero values. In general, a scaling function which is used to define a wavelet is defined as any function satisfying the recursion relationship $$\phi(x) = \Sigma\, d_k\, \phi(2x - k) \quad (7)$$

$$\sum_k d_k = 2 \quad (8)$$

$$\sum_k d_k\, d_{k+2L} = 2 \text{ if } L = 0,\ = 0 \text{ if } L \ne 0 \quad (9)$$

Here, k runs from 0 to N31 1 and $d_k=0$ for $k<0$ or $k>N-1$. A wavelet, w(x), is any translation and/or dilation of a scaling function, i.e., for j and k integers, $$w(x) = 2^{j/2}\, \phi(2^j x - k) \quad (10)$$

Although the above discussion has utilized gray scale images, it will be apparent to those skilled in the art that images having color may also be compressed utilizing the present invention. An image having color consists of a two-dimensional array of pixels in which each pixel is a vector having one component for each of the three primary colors. Such an image can be thought of as three gray scale images.

There has been described herein a novel image compression method and apparatus. Various modifications to the present invention will become apparent to those skilled in the art from the foregoing description and accompanying drawings. Accordingly, the present invention is to be limited solely by the scope of the following claims.

What is claimed is:

1. An apparatus for compressing an image comprising a two dimensional array of pixels organized as a plurality of rows and columns, said apparatus comprising:
   means for transforming said image to form a plurality of component images, said component images representing different spatial frequency components of said image and comprising two dimensional arrays of pixels; and
   quantizer means for assigning integer values to the pixels of said component images,
   wherein said transforming means comprises means for generating two vectors, $y_L$ and $y_H$, from a linear array, x(i), of M pixels, and wherein $y_L$ and $y_H$ have components defined by $$y_L(m) = \sum_{k=0}^{N-1} a(k) x(2m - N + k)$$

$$y_H(m) = \sum_{k=0}^{N-1} a(k) (-1)^{k+1} x(2m + 1 - k)$$

and wherein the a(k) satisfy the conditions $$\sum_{i=0}^{N-1} a^2(i) = 1$$

and $$\sum_{i=0}^{N-1} a(i) a(i + k) = 0 \text{ for } k \text{ equal to any non-zero even integer}$$

wherein $a(k)=0$ for $k<0$ or $k>(N-1)$ and N is an even number greater than 4 and less than 30, and $$\sum_{i=0}^{N-1} a(i) = \sqrt{2}\ .$$

2. The apparatus of claim 1 wherein the largest component image is no larger than N×N pixels.

3. The apparatus of claim 1 wherein said quantizer means comprises means for approximating the statistical distribution of pixel levels in each said component image by Laplacian probability distribution.

4. The apparatus of claim 1 wherein x(i) is defined to be x(i+M) and wherein m runs from 0 to (M/2)−1.

5. An apparatus for decompressing an image which has been decomposed into a plurality of component images, said apparatus comprising synthesizing means for combining first and second said component images to form a third image, said synthesizing means comprising means for generating a vector z having components, z(i), from two arrays of pixels $x_L(i)$ and $x_H(i)$, $x_L$ being taken from first component image and $x_H$ being taken from said second component image, wherein $$z(2m) = \sum_{k=0}^{(N/2)-1} a(2k) x_L[m - k + (N/2)] + \sum_{k=0}^{(N/2)-1} a(2k+1) x_H(m+k)$$

$$z(2m+1) = \sum_{k=0}^{(N/2)-1} a(2k+1) x_L[m + (N/2) - k] - \sum_{k=0}^{(N/2)-1} a(2k) x_H(m+k).$$

6. A method for compressing an image comprising a two dimensional array of pixels organized as a plurality of rows and columns, said method comprising the steps of:
   transforming said image to form a plurality of component images, said component images representing different spatial frequency components of said image and comprising two dimensional arrays of pixels; and assigning integer values to the pixels of said component images, wherein said transforming step comprises generating two vectors, $y_L$ and $y_H$, from a linear array, $x(i)$, of M pixels, and wherein $y_L$ and $y_H$ have components defined by $$y_L(m) = \sum_{k=0}^{N-1} a(k)x(2m - N + k)$$

$$y_H(m) = \sum_{k=0}^{N-1} a(k)(-1)^{k+1}x(2m + 1 - k)$$

and wherein the $a(k)$ satisfy the conditions $$\sum_{i=0}^{N-1} a^2(i) = 1$$

and $$\sum_{i=0}^{N-1} a(i)a(i + k) = 0 \text{ for } k = \text{any even, non-zero integer}$$

wherein $a(k)=0$ for $k<0$ or $k>(N-1)$ and N is an even number greater than 2 and less than 20, and $$\sum_{i=0}^{N-1} a(i) = \sqrt{2} .$$

7. The method of claim 6 wherein the largest component image is no larger than N×N pixels.

8. The method of claim 6 wherein said step of assigning integers comprises for approximating the statistical distribution of pixel levels in each said component image by the Laplacian probability distribution.

9. The method of claim 6 wherein $x(i)$ is defined to be $x(i30 M)$ and wherein m runs from 0 to $(M/2)-1$.

10. A method for decompressing an image, said image including first and second component images, each said component image comprising a plurality of pixels organized as a plurality of rows or columns, said method comprising the step of combining said first and second said component images to form a third image, said combining step comprising generating a vector z having components, $z(i)$, from two arrays of pixels $x_L(i)$ and $x_H(i)$, $x_L$ being taken from first component image and $x_H$ eing taken from said second component image, wherein $$z(2m) = \sum_{k=0}^{(N/2)-1} a(2k)x_L[m - k + (N/2)] +$$

$$\sum_{k=0}^{(N/2)-1} a(2k + 1)x_H(m + k)$$

$$z(2m + 1) = \sum_{k=0}^{(N/2)-1} a(2k + 1)x_L[m + (N/2) - k] -$$

$$\sum_{k=0}^{(N/2)-1} a(2k)x_H(m + k).$$

11. An apparatus for compressing an image comprising a two dimensional array of pixels organized as a plurality of rows and columns, said apparatus comprising;

means for transforming said image to form a plurality of component images, said component images representing different spatial frequency components of said image and comprising two dimensional arrays of pixels, said transforming means comprising means for representing a linear array of M pixels in said image by a wavelet expansion in wavelets having support N, where $4<N<30$; and quantizer means for assigning integer values to the pixels of said component images.

* * * * *

UNITED STATES PATENT AND TRADEMARK OFFICE
CERTIFICATE OF CORRECTION

PATENT NO. : 5,014,134
DATED : May 7, 1991
INVENTOR(S) : Lawton, et al.

It is certified that error appears in the above-identified patent and that said Letters Patent is hereby corrected as shown below:

Column 2, line 52, delete "effect" and insert therefor --affect--.

Column 2, line 62, after "image" insert --.--.

Column 3, line 1, after "image" insert --.--.

Column 7, line 48, delete "$y_LL(i)$" and insert therefor --$y_L(i)$--.

Column 5, line 47, delete "denote" and insert therefor --denoted--.

Column 7, line 5, after "large" delete "are".

Column 9, line 35, delete ".1$h$8".

Column 9, line 48, after "such" delete "an".

Column 14, line 2, delete "x(i30 M)" and insert therefor --x(i + M)--.

Column 14, line 12, delete "eing" and insert therefor --being--.

Signed and Sealed this

Third Day of August, 1993

Attest:

MICHAEL K. KIRK

*Attesting Officer*    *Acting Commissioner of Patents and Trademarks*